US012738156B2

(12) United States Patent
Oh et al.

(10) Patent No.: US 12,738,156 B2
(45) Date of Patent: Sep. 15, 2026

(54) METHOD AND SYSTEM FOR DRIVING NEGOTIATION FOR VEHICLES WITH COOPERATION BETWEEN CCTV AND ROAD SIDE UNIT

(71) Applicants: Penta Security Inc., Seoul (KR); Autocrypt Co., Ltd., Seoul (KR)

(72) Inventors: Jin Hyeok Oh, Gwangmyeong-si (KR); Keon Yun, Seoul (KR); Sang Min Lee, Seoul (KR); Heesun Yun, Seoul (KR); Minchul Kim, Seoul (KR); Myong Cheol Lim, Seoul (KR); Tae Gyun Kim, Yongin-si (KR); Sang Gyoo Sim, Seoul (KR); Duk Soo Kim, Seoul (KR); Eui Seok Kim, Seoul (KR)

(73) Assignees: Penta Security Inc., Seoul (KR); Autocrypt Co., Ltd., Seoul (KR)

( * ) Notice: Subject to any disclaimer, the term of this patent is extended or adjusted under 35 U.S.C. 154(b) by 348 days.

(21) Appl. No.: 18/394,947

(22) Filed: Dec. 22, 2023

(65) Prior Publication Data

US 2025/0209912 A1 Jun. 26, 2025

(51) Int. Cl.

*G08G 1/017* (2006.01)
*G06V 20/62* (2022.01)
*G08G 1/09* (2006.01)
*H04N 7/18* (2006.01)

(52) U.S. Cl.

CPC ......... *G08G 1/0175* (2013.01); *G06V 20/625* (2022.01); *G08G 1/091* (2013.01); *H04N 7/18* (2013.01)

(58) Field of Classification Search

CPC .. G06V 20/625; G08G 1/0116; G08G 1/0175; G08G 1/091; H04N 7/18

See application file for complete search history.

(56) References Cited

U.S. PATENT DOCUMENTS

2018/0279183 A1 9/2018 Song et al.
2023/0047689 A1 2/2023 Lee et al.
(Continued)

FOREIGN PATENT DOCUMENTS

CN 111429739 A 7/2020
JP 2024-42316 A 3/2024
(Continued)

OTHER PUBLICATIONS

ETSI EN 302 637-3 V1.3.1 "Intelligent Transport Systems (Its); Vehicular Communications; Basic Set of Applications; Part 3: Specifications of Decentralized Environmental Notification Basic Service," Apr. 2019.

(Continued)

*Primary Examiner* — Timothy X Pham

(74) *Attorney, Agent, or Firm* — BROADVIEW IP LAW, PC

(57) ABSTRACT

A method according to an example embodiment of the present disclosure may comprise: when a vehicle being performing a driving negotiation moves, receiving, by an RSU, a first message including a first temporary identification (ID) of the vehicle from a first RSU on a past route of the vehicle; receiving, by the RSU, a second message including a second temporary ID of the vehicle identified by a closed-circuit television (CCTV) in a communicable area of the RSU from the CCTV; checking, by the RSU, the second temporary ID of the vehicle based on the second message received from the CCTV; and identifying, by the RSU, the vehicle as a target to extend the driving negotiation and performing the driving negotiation with the identified vehicle.

16 Claims, 7 Drawing Sheets

(56) References Cited

U.S. PATENT DOCUMENTS

| | | | | |
|---|---|---|---|---|
| 2023/0056581 | A1 | 2/2023 | Song et al. | |
| 2023/0137349 | A1 | 5/2023 | Son | |
| 2023/0143929 | A1 | 5/2023 | Yun et al. | |
| 2024/0177609 | A1 | 5/2024 | Lim et al. | |
| 2024/0312340 | A1* | 9/2024 | Yoon | G08G 1/015 |
| 2024/0363002 | A1* | 10/2024 | Park | G08G 1/0112 |
| 2024/0428681 | A1* | 12/2024 | Anand | G08G 1/0133 |
| 2025/0136153 | A1* | 5/2025 | Tang | G08G 1/01 |

FOREIGN PATENT DOCUMENTS

| | | | |
|---|---|---|---|
| KR | 10-2412276 | B1 | 6/2022 |
| KR | 10-2023-0024664 | A | 2/2023 |
| KR | 10-2023-0027625 | A | 2/2023 |
| KR | 10-2023-0062962 | A | 5/2023 |
| KR | 10-2533710 | B1 | 5/2023 |
| KR | 10-2533711 | B1 | 5/2023 |
| KR | 10-2580643 | B1 | 9/2023 |
| KR | 10-2023-0175055 | A | 12/2023 |
| WO | 2023/016464 | A1 | 2/2023 |

OTHER PUBLICATIONS

Wu, Hsin-Te et al. (2010) “A Novel Rsu-Based Message Authentication Scheme for VANET,” 2010 Fifth International Conference on Systems and Networks Communications. DOI: 10.1109/ICSNC.2010.23.

* cited by examiner

FIG. 4

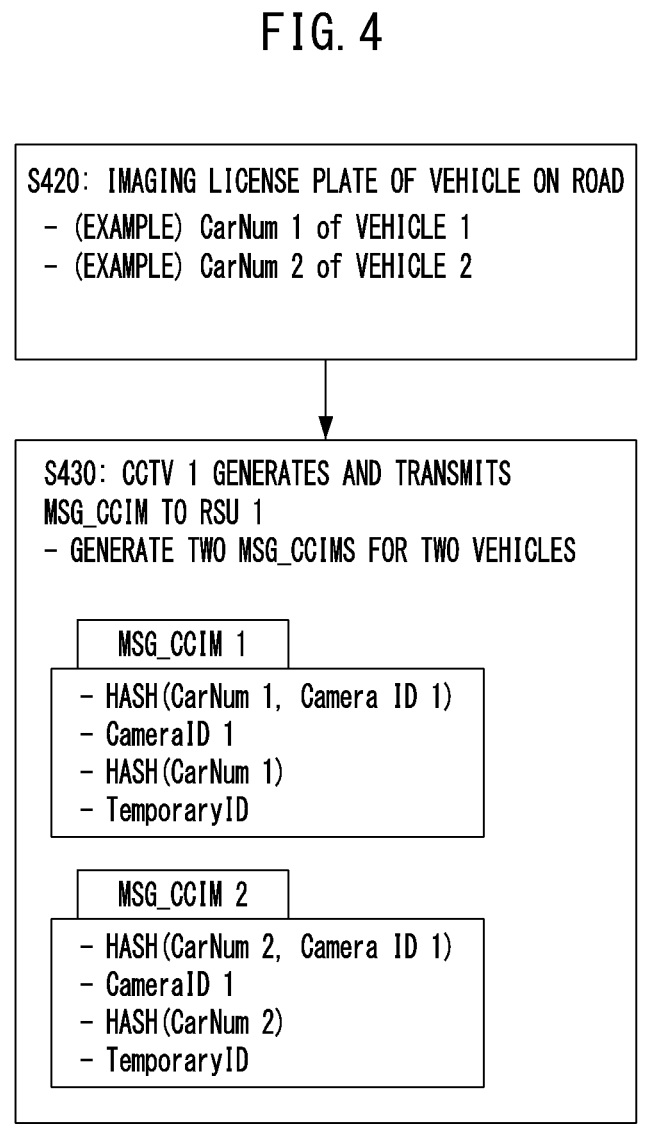

S420: IMAGING LICENSE PLATE OF VEHICLE ON ROAD
- (EXAMPLE) CarNum 1 of VEHICLE 1
- (EXAMPLE) CarNum 2 of VEHICLE 2

S430: CCTV 1 GENERATES AND TRANSMITS MSG_CCIM TO RSU 1
- GENERATE TWO MSG_CCIMS FOR TWO VEHICLES

MSG_CCIM 1
- HASH(CarNum 1, Camera ID 1)
- CameraID 1
- HASH(CarNum 1)
- TemporaryID MSG_CCIM 2
- HASH(CarNum 2, Camera ID 1)
- CameraID 1
- HASH(CarNum 2)
- TemporaryID

METHOD AND SYSTEM FOR DRIVING NEGOTIATION FOR VEHICLES WITH COOPERATION BETWEEN CCTV AND ROAD SIDE UNIT

BACKGROUND

1. Technical Field

Example embodiments of the present disclosure relate, in general, to a method for a road side unit (RSU) to perform a driving negotiation with a traveling vehicle, and more particularly, to a driving negotiation technology with which surrounding infrastructure supports information required for a driving negotiation to enhance safety of the driving negotiation.

2. Related Art

The description in this section merely provides background information of the present disclosure and does not constitute prior art.

With the development of advanced driver assistance systems (ADASs), driving is gradually being made safer and more convenient. The level of autonomy provided by autonomous driving systems is also increasing, and commercial vehicles corresponding to level 2.5 autonomy have been released lately. In Korea, several industry-academic research centers are developing core technologies for autonomous driving with the goal of reaching level 4 or higher by 2027.

To improve the stability and reliability of autonomous driving, vehicle communication technologies are being used together with autonomous driving technologies. Initially, vehicle communication technologies were limited to a warning service for notifying of dangers during driving due to the latency thereof and the low performance of the communication speed, but the services are gradually expanding with the improvement of communication performance.

Recently, the development and standardization of fifth generation (5G) new radio (NR) vehicle-to-everything (V2X) made it possible to transmit real-time data and a large amount of information between two objects, enabling the expansion of a sensing range required for autonomous driving, the transmission and reception of local dynamic map (LDM) information, and the like. Previously, services were limited to unilateral data transmission or broadcasting to multiple mobile objects, but with the development of communication technology, services have advanced to a stage in which it is possible to control a vehicle while exchanging real-time data with mobile objects.

To date, most of the research has been conducted on a single vehicle or a specific vehicle controller receiving communication information from its surroundings, determining priorities of traffic at an intersection or junction, and distributing the priorities unilaterally. For example, in the case of remote parking, a method of recognizing the location information of an entering vehicle, generating a route to the destination by the server, and issuing control information to the vehicle has been studied. However, it is still necessary to research how to allow several vehicles on the road to continuously communicate with each other for more efficient and safer driving.

SUMMARY

According to the foregoing related art, driving negotiations are possible through the message specification defined in Society of Automotive Engineers (SAE) J2735. The message specification is proposed for vehicle-to-vehicle (V2V) communication and vehicle-to-infrastructure (V2I) communication.

According to the related art, road side units (RSUs) are limited in their ability to cover all areas of the road to perform driving negotiations. When the surrounding infrastructure supports more information, driving negotiations may be performed more smoothly, and the safety of driving negotiations may be enhanced.

However, according to the related art, key infrastructure such as closed-circuit televisions (CCTVs) cannot participate in driving negotiations even when it is necessary and/or required to participate, because message specifications are not supported.

Accordingly, example embodiments of the present disclosure are provided to substantially obviate one or more problems due to limitations and disadvantages of the related art.

Example embodiments of the present disclosure provide a device that allows a system having imaging apparatuses, such as CCTVs, in a particular area on a road as infrastructure around the road to participate in driving negotiations.

Example embodiments of the present disclosure also provide message specifications for infrastructure around a road for accurately identifying the travel status of a vehicle.

Example embodiments of the present disclosure also provide a vehicle driving negotiation method in which safety is enhanced by cooperation and role division between RSUs and CCTVs.

A method of performing a driving negotiation with a traveling vehicle, according to an example embodiment of the present disclosure, may comprise: when a vehicle being performing a driving negotiation moves, receiving, by a road side unit (RSU), a first message including a first temporary identification (ID) of the vehicle from a first RSU on a past route of the vehicle; receiving, by the RSU, a second message including a second temporary ID of the vehicle identified by a closed-circuit television (CCTV) in a communicable area of the RSU from the CCTV: checking, by the RSU, the second temporary ID of the vehicle based on the second message received from the CCTV; and identifying, by the RSU, the vehicle as a target to extend and/or continue the driving negotiation and performing the driving negotiation with the identified vehicle.

The checking, by the RSU, of the second temporary ID of the vehicle based on the second message received from the CCTV may comprise: identifying the second temporary ID of the vehicle based on the second message; and identifying an encryption value of a unique ID of the vehicle based on the second message.

The identifying, by the RSU, of the vehicle as the target to extend and/or continue the driving negotiation and the performing of the driving negotiation with the identified vehicle may comprise: identifying the vehicle as the target based on an encryption value of a unique ID of the vehicle; and performing the driving negotiation with the vehicle based on the second temporary ID of the vehicle.

The first message may include an encryption value of a unique ID of the vehicle and a CCTV ID, the CCTV ID, an encryption value of the unique ID of the vehicle, and the first temporary ID of the vehicle.

The method may further comprise: imaging, by the CCTV, a license plate of the vehicle to acquire a unique ID of the vehicle: updating, by the CCTV, the first temporary ID of the vehicle in the first message received from the RSU with the second temporary ID of the vehicle; and generating, by the CCTV, the second message including the second temporary ID of the vehicle.

The method may further comprise transmitting, by the RSU, the first message to the CCTV.

The updating, by the CCTV, of the first temporary ID of the vehicle in the first message with the second temporary ID of the vehicle may comprise: identifying, by the CCTV, a correspondence between the first message and the vehicle using the unique ID of the vehicle obtained through the imaging; and updating, by the CCTV, the first temporary ID of the vehicle in the first message with the second temporary ID of the vehicle received from the vehicle to generate the second message.

The identifying, by the CCTV, the correspondence between the first message and the vehicle may comprise: extracting a unique ID of the vehicle from the first message, which includes an encryption value of the unique ID of the vehicle and a first CCTV ID, the first CCTV ID, and an encryption value of the unique ID of the vehicle, using the unique ID of the vehicle obtained through the imaging; and comparing the unique ID of the vehicle in the first message with the unique ID of the vehicle obtained through the imaging to identify the correspondence between the first message and the vehicle.

The method may further comprise: imaging, by a first CCTV in a communicable area of the first RSU, a license plate of the vehicle to acquire a unique ID of the vehicle; and generating, by the first CCTV, the first message which includes an encryption value of the unique ID of the vehicle and a first CCTV ID, the first CCTV ID, an encryption value of the unique ID of the vehicle, and the first temporary ID of the vehicle.

The method may further comprise: transmitting, by the first CCTV, the first message to the first RSU; and transmitting, by the first RSU, the first message to the RSU on a travel route of the vehicle when the vehicle moves.

A system for performing a driving negotiation with a traveling vehicle, according to an example embodiment of the present disclosure, may comprise: a road side unit (RSU); and a closed-circuit television (CCTV) in a communicable area of the RSU.

In the system according to an example embodiment of the present disclosure, when a vehicle being performing a driving negotiation moves, the RSU may receive a first message including a first temporary identification (ID) of the vehicle from a first RSU on a past route of the vehicle, the RSU may receive a second message including a second temporary ID of the vehicle identified by the CCTV from the CCTV, the RSU may check the second temporary ID of the vehicle based on the second message received from the CCTV; and the RSU may identify the vehicle as a target to extend and/or continue the driving negotiation and performs the driving negotiation with the identified vehicle.

When the RSU checks the second temporary ID of the vehicle based on the second message received from the CCTV, the RSU may identify the second temporary ID of the vehicle based on the second message and identify an encryption value of a unique ID of the vehicle based on the second message.

When the RSU identifies the vehicle as the target to extend and/or continue the driving negotiation and performs the driving negotiation with the identified vehicle, the RSU may identify the vehicle as the target based on an encryption value of a unique ID of the vehicle and perform the driving negotiation with the vehicle based on the second temporary ID of the vehicle.

The first message may include an encryption value of a unique ID of the vehicle and a CCTV ID, the CCTV ID, an encryption value of the unique ID of the vehicle, and the first temporary ID of the vehicle.

In the system according to an example embodiment of the present disclosure, the CCTV may acquire a unique ID of the vehicle by imaging a license plate of the vehicle, the CCTV may update the first temporary ID of the vehicle in the first message received from the RSU with the second temporary ID of the vehicle, and the CCTV may generate the second message including the second temporary ID of the vehicle.

The RSU may transmit the first message to the CCTV.

When the CCTV updates the first temporary ID of the vehicle in the first message with the second temporary ID of the vehicle, the CCTV may identify a correspondence between the first message and the vehicle using the unique ID of the vehicle obtained by imaging the license plate and generate the second message by updating the first temporary ID of the vehicle in the first message with the second temporary ID of the vehicle received from the vehicle.

When the CCTV identifies the correspondence between the first message and the vehicle, the CCTV may extract a unique ID of the vehicle from the first message, which includes an encryption value of the unique ID of the vehicle and a first CCTV ID, the first CCTV ID, and an encryption value of the unique ID of the vehicle, using the unique ID of the vehicle obtained by imaging the license plate and identify the correspondence between the first message and the vehicle by comparing the unique ID of the vehicle in the first message with the unique ID of the vehicle obtained by imaging the license plate.

The system may further comprise: the first RSU; and a first CCTV in a communicable area of the first RSU, wherein the first CCTV may acquire a unique ID of the vehicle by imaging a license plate of the vehicle, and the first CCTV may generate the first message including an encryption value of a unique ID of the vehicle and a first CCTV ID, an encryption value of the unique ID of the vehicle, and the first temporary ID of the vehicle.

The first CCTV may transmit the first message to the first RSU, and the first RSU may transmit the first message to the RSU on a travel route of the vehicle when the vehicle moves.

According to an example embodiment of the present disclosure, a system having imaging apparatuses, such as CCTVs, in a particular area on a road as infrastructure around the road can participate in driving negotiations according to the proposed message specifications.

According to an example embodiment of the present disclosure, an RSU provides information required for a driving negotiation to another RSU. Accordingly, the driving negotiations can be smoothly performed, and the safety of the driving negotiation can be enhanced.

According to an example embodiment of the present disclosure, an RSU is not directly provided with the unique ID of a vehicle but is only provided with an encryption value of the unique ID of a vehicle. Accordingly, a driving negotiation can be performed without compromising the privacy of the vehicles to the RSU.

According to an example embodiment of the present disclosure, a temporary ID is used for a driving negotiation between an RSU and a vehicle, and thus a new driving negotiation is performed every time. Accordingly, the unique ID is not directly exposed to the RSU.

According to an example embodiment of the present disclosure, a vehicle that falsely requests cooperative driving can be easily determined. For example, it is possible to determine a vehicle that sends a message under the assumed name of an emergency vehicle (ambulance, fire truck, police car, or the like). In this case, the authenticity of the vehicle which is under the assumed name can be verified using a predefined CIM message generated by a CCTV.

BRIEF DESCRIPTION OF DRAWINGS

FIGS. 4 to 6 are conceptual diagrams illustrating a driving negotiation process between a traveling vehicle and RSUs in detail according to an example embodiment of the present disclosure.

DETAILED DESCRIPTION OF THE EMBODIMENTS

Figure 1:
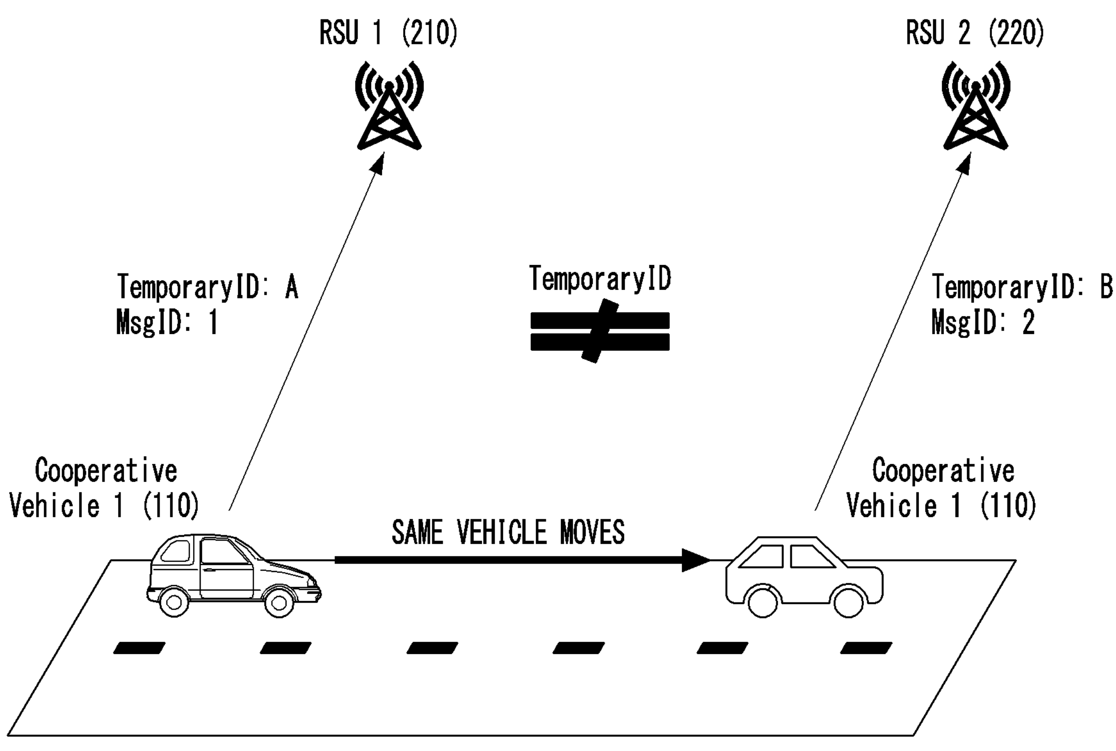
FIG. 1 is a conceptual diagram illustrating a driving negotiation process between a traveling vehicle employing a temporary identification (ID) and road side units (RSUs) according to an example embodiment of the present disclosure.

In addition to the above objectives, other objectives and features of the present disclosure will be clearly revealed through the description of the example embodiments with reference to the accompanying drawings.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, even a technology known before the filing date of the present application may be included as a part of the configuration of the present disclosure when necessary, and will be described herein without obscuring the spirit of the present disclosure. However, in describing the configuration of the present disclosure, the detailed description of a technology known before the filing date of the present application that those of ordinary skill in the art can clearly understand may obscure the spirit of the present disclosure, and thus a detailed description of the related art will be omitted.

Techniques for performing driving negotiations between vehicles and between vehicles and infrastructure using, for example, vehicle-to-vehicle (V2V) communication and vehicle-to-infrastructure (V2I) communication and the like, may employ the related art of the present disclosure, and at least a part of the related art may be applied as elementary techniques necessary to implement the present disclosure. For example, elementary techniques necessary to implement some elements of the present disclosure are known to those of ordinary skill in the art through Korean Patent Application Publication No. 10-2023-0027625 "Method for collaborative driving based on driving negotiation and apparatus using the same," Korean Patent Application Publication No. 10-2023-0024664 "Apparatus and method for autonomous driving vehicle negotiation based on V2V communication," and the like.

However, it is not the intent of the present disclosure to claim any rights to the related art, and the content of the related art may be incorporated as part of the present disclosure without departing from the spirit of the present disclosure.

Hereinafter, preferred embodiments of the present disclosure will be described in detail with reference to the accompanying drawings. In describing the present disclosure, the same reference numerals are used for identical components in the drawings, and the same description of identical components will not be reiterated.

In this specification, the term "closed-circuit television (CCTV)" is not limited by this name and may be understood as an apparatus that may be included in infrastructure around a road and provide an imaging device for a specific area.

FIG. 1 is a conceptual diagram illustrating a driving negotiation process between a traveling vehicle employing a temporary identification (ID) and road side units (RSUs) according to an example embodiment of the present disclosure.

When a cooperative vehicle 110 enters a driving negotiation zone, RSU 1 (210) may perform driving negotiation with the cooperative vehicle 110 using a first temporary ID (e.g., "A"). To this end, the cooperative vehicle 110 may transmit a message (e.g., MsgID: "1") including the first temporary ID of the cooperative vehicle 110 to RSU 1 (210).

Here, a temporary ID may be a value that changes to prevent a vehicle from exposing its unique number (i.e., to protect privacy) every time the vehicle and an RSU perform a driving negotiation. In other words, to protect privacy, a temporary ID may continuously change at certain distances and at certain time intervals. Therefore, every time a temporary ID changes, it is necessary to perform a new driving negotiation. Here, the unique number of a vehicle may be a fixed ID for specifying the vehicle, for example, a vehicle license number.

For example, the first temporary ID (e.g., "A") may be changed to a second temporary ID (e.g., "B") when the cooperative vehicle 110 travels a certain distance after a certain period of time. When the cooperative vehicle 110 enters a driving negotiation zone, RSU 2 (220) may perform a driving negotiation with the cooperative vehicle 110 using the second temporary ID (e.g., "B"). To this end, the cooperative vehicle 110 may transmit a message (e.g., MsgID: "2") including the second temporary ID of the cooperative vehicle 110 to RSU 2 (220).

As described above, a vehicle performs a driving negotiation using a temporary ID. When the temporary ID changes, the vehicle may not continue and/or be extended the existing driving negotiation, and it may be necessary to perform a new driving negotiation, which is problematic. Also, when there are several vehicles in the communicable area of an RSU, a driving negotiation of a vehicle is not smoothly performed.

Figure 2:
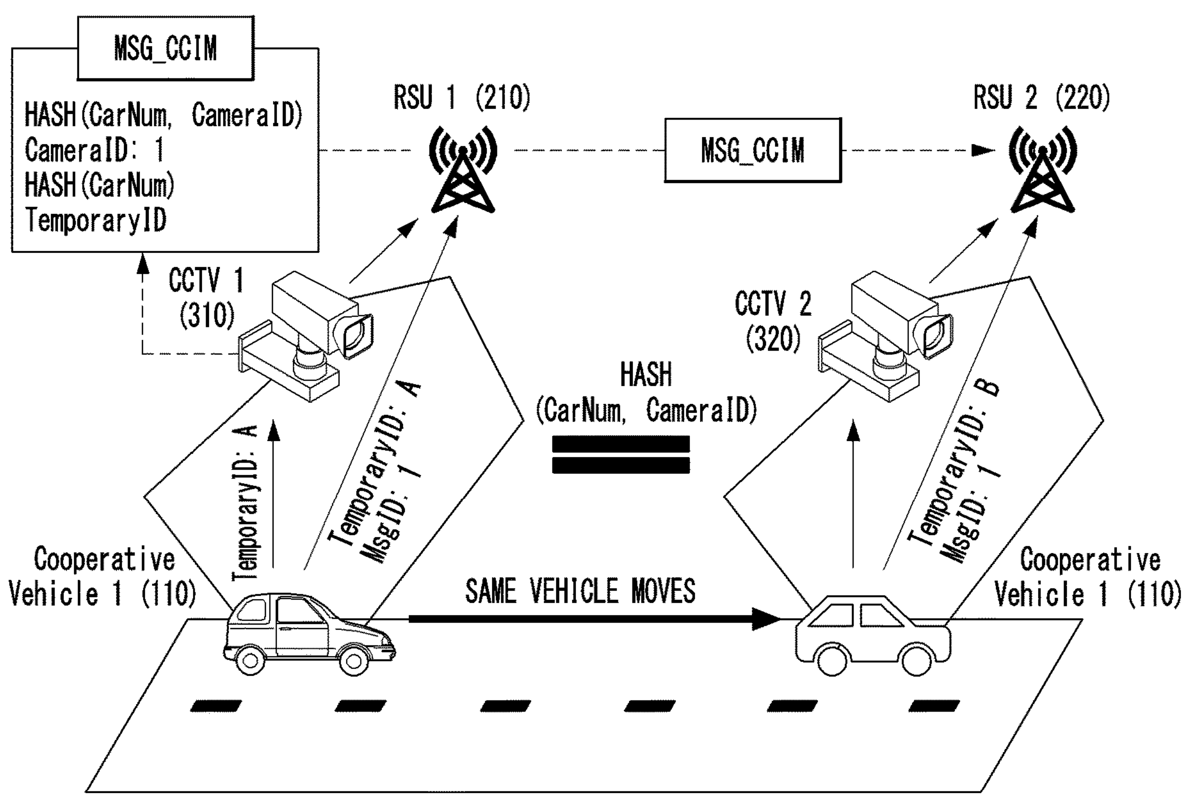
FIG. 2 is a conceptual diagram illustrating a driving negotiation process between a vehicle traveling in cooperation with surrounding infrastructure, such as CCTVs, and RSUs and a message format according to an example embodiment of the present disclosure.

FIG. 2 is a conceptual diagram illustrating a driving negotiation process between a vehicle traveling in cooperation with surrounding infrastructure, such as CCTVs, and RSUs and a message format according to an example embodiment of the present disclosure.

CCTVs 310 and 320 may be installed at any locations in communicable areas of the foregoing RSUs 210 and 220 of FIG. 1.

When the traveling cooperative vehicle 110 enters the communicable area of RSU 1 (210), the cooperative vehicle 110 may transmit a message (e.g., MsgID: "1") including a first temporary ID (e.g., "A") of the cooperative vehicle 110 to RSU 1 (210).

When the traveling cooperative vehicle 110 deviates from the communicable area of RSU 1 (210) before finishing the driving negotiation with RSU 1 (210), the driving negotiation of the cooperative vehicle 110 may continue and/or be extended in the following manner.

For example, the cooperative vehicle 110 may transmit the first temporary ID to CCTV 1 (310) in the communicable area of RSU 1 (210). CCTV 1 (310) may transmit a first message, which includes an encryption value of an acquired unique ID of the cooperative vehicle 110 and an ID (DE_CameraID, hereinafter, "CameraID") of CCTV 1 (310), the ID (e.g., "1") of CCTV 1 (310), an encryption value of the unique ID of the cooperative vehicle 110, and the first temporary ID of the cooperative vehicle 110, to RSU 1 (210) in a CCTV information message (MSG_CCIM) format.

As the types of message frames, MSG_CCIM, MSG_Map Data, MSG_SPAT, and the like may be used. According to an example embodiment of the present disclosure, the MSG_CCIM frame or a modification thereof may be proposed. The MSG_CCIM format may have a data frame (DF). DFs may have sub-formats such as a DF CCTV information message (DF_CIM), DF_BSNCoreData, DF_part II, and the like. The DF_CIM may have a data element (DE). DEs may have sub-formats such as DE_CameraID, DE_CarNum, DE_CCTV_VehicleType, and the like.

The message frame MSG_CCIM may have a new message field for communication between CCTVs and infrastructure. The DF_CIM which is a new message field for a CCTV to provide vehicle information may be defined in the DF. The DF_CIM may bring information required for a driving negotiation from the DE fields.

The DE_CameraID may be a unique ID of a CCTV.

The DE_CarNum may be a unique ID (an ID or vehicle license number) of a vehicle imaged by the CCTV.

The DE_CCTV_VehicleType may be a type of vehicle (e.g., a passenger car, a truck, a bus, a police car, or the like) imaged by the CCTV.

A driving negotiation may be started with an MSG_CCIM transmitted from a CCTV to an RSU. When the CCTV transmits the MSG_CCIM to the RSU, a DF_CIM may be transmitted together. Here, the DF_CIM may include required information among DEs.

As described above, when CCTV 1 (310) transmits the MSG_CCIM including a DE_CarNum value to an RSU, CCTV 1 (310) may transmit a hashed CarNum value and a hashed CameraID value (HASH (CameraID, CameraNum) values) to protect privacy of the vehicle.

For example, it is assumed that the value "BBBB" is obtained by hashing the message "ABCD" using the SHA256 algorithm. When the same algorithm is used for hashing, "ABCD" always has the value "BBBB." However, the original message "ABCD" is not derived from the value "BBBB."

As described above, CCTV 1 (310) may image a vehicle license number and hash the vehicle license number together with its ID, i.e., CameraID. Specifically, CCTV 1 (310) may image a vehicle license number of A. HASH (CameraNum+CameraID 1) may be generated by hashing a value obtained by adding the vehicle license number of A and the Camera ID value. Assuming that HASH (CameraNum+CameraID)=ABCDEF, when CarNum is equal to CameraID, ABCDEF may not change.

As described above, a CCTV may obtain a CarNum value by imaging a vehicle, and an RSU only receives a hash value of the CarNum value and thus is not able to infer the unique ID of the vehicle (the license number information of the vehicle).

Since another infrastructure (e.g., CCTV 2) is not able to check HASH (CameraID, CarNum) without a CameraID value even when HASH (CameraID, CarNum) is received, the CameraID value may be included in the MSG_CCIM. In other words, CCTV 1 (310) may transmit HASH (CameraID, CarNum) values and the CameraID value together to RSU 1 (210).

When the traveling cooperative vehicle 110 travels a certain distance or more to enter the communicable area of RSU 2 (220), the cooperative vehicle 110 may transmit a message (e.g., MsgID: 1) including a second temporary ID (e.g., "B", an updated temporary ID from the first temporary ID) of the cooperative vehicle 110 to RSU 2 (220). In FIG. 2, the ID (MsgID) of the message including the second temporary ID is shown as "1." However, the present disclosure is not limited to this embodiment, and regardless of the example embodiment of FIG. 2, the message ID and the like may be changed as necessary.

The cooperative vehicle 110 may transmit the second temporary ID of the cooperative vehicle 110 to CCTV 2 (320) in the communicable area of RSU 2 (220). CCTV 2 (320) may acquire the unique ID (CarNum) of the cooperative vehicle 110 by imaging the license plate of the cooperative vehicle 110. CCTV 2 (320) may transmit a second message, which includes an encryption value HASH (CarNum, CameraID) of the acquired unique ID of the cooperative vehicle 110 and an ID (CameraID) of CCTV 2 (320), the ID (e.g., "2") of CCTV 2 (320), an encryption value (HASH (CarNum)) of the unique ID of the cooperative vehicle 110, and the second temporary ID of the cooperative vehicle 110, to RSU 2 (220) in the MSG_CCIM format.

RSU 2 (220) may receive the first message and the second message and identify the encryption value of the unique ID of cooperative vehicle 110 and the second temporary ID to continuously perform the driving negotiation.

Figure 3:
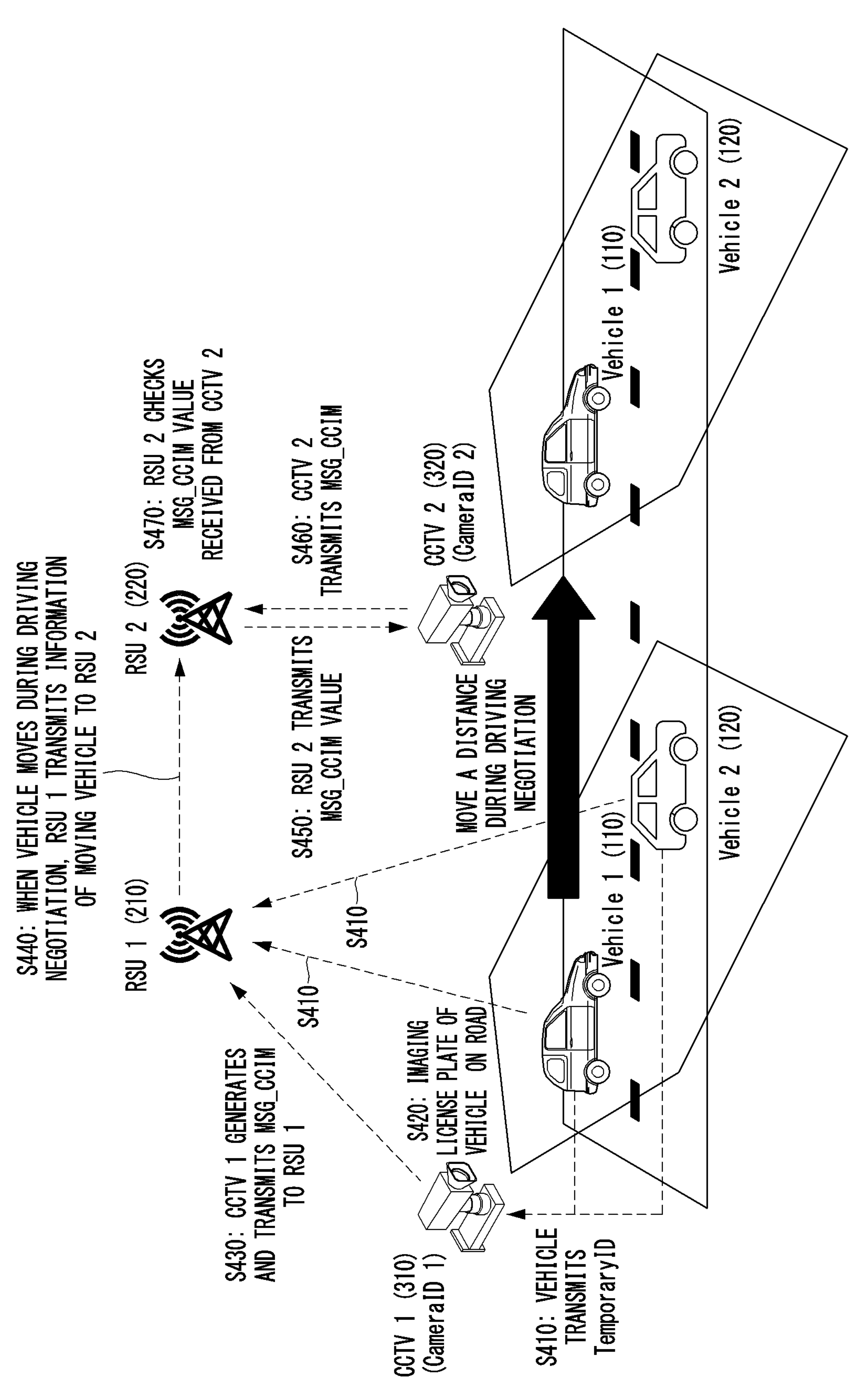
FIG. 3 is a conceptual diagram illustrating a driving negotiation process between a traveling vehicle and RSUs based on cooperation with surrounding infrastructure, such as CCTVs, in detail according to an example embodiment of the present disclosure.

FIG. 3 is a conceptual diagram illustrating a driving negotiation process between a traveling vehicle and RSUs based on cooperation with surrounding infrastructure, such as CCTVs, in detail according to an example embodiment of the present disclosure.

A system that performs a driving negotiation with a traveling vehicle according to an example embodiment of the present disclosure may include RSU 2 (220) and CCTV 2 (320).

For example, it is assumed in FIG. 3 that two or more vehicles (e.g., 110 and 120) travel in the communicable area of a specific RSU. When there are several vehicles without unique IDs, a vehicle for a driving negotiation is not specified by the RSU. Accordingly, a system for performing a driving negotiation without compromising privacy even using unique IDs of vehicles will be described below.

In the system according to the example embodiment of the present disclosure, when the vehicle (e.g., 110) which is performing a driving negotiation moves, RSU 2 (220) may receive a first message including a first temporary ID of the vehicle 110 from RSU 1 (210) on the past route of the vehicle 110, receive a second message including a second temporary ID of the vehicle 110 identified by CCTV 2 (320) from CCTV 2 (320), check the second temporary ID of the vehicle 110 based on the second message received from CCTV 2 (320), identify the vehicle 110 as a target with which the driving negotiation will continue and/or be extended, and perform the driving negotiation with the identified vehicle 110.

When RSU 2 (220) checks the second temporary ID of the vehicle 110 based on the second message received from CCTV 2 (320), RSU 2 (220) may identify the second temporary ID of the vehicle 110 based on the second message and identify an encryption value of the unique ID of the vehicle 110 based on the second message.

When RSU 2 (220) identifies the vehicle 110 as the target with which the driving negotiation will continue and/or be extended and performs the driving negotiation with the identified vehicle 110, RSU 2 (220) may identify the vehicle 110 as the target based on the encryption value of the unique ID of the vehicle 110 and perform the driving negotiation with the vehicle 110 based on the second temporary ID of the vehicle 110.

In the system according to the example embodiment of the present disclosure, the first message may include an encryption value of the unique ID of the vehicle 110 and a CCTV ID (i.e., the ID of CCTV 2 (320)), the CCTV ID, an encryption value of the unique ID of the vehicle 110, and the first temporary ID of the vehicle 110.

Therefore, when RSU 2 (220) receives first messages and second messages regarding the two vehicles 110 and 120, RSU 2 (220) may specify the vehicles by comparing the unique IDs of the vehicles included in the first messages with the unique IDs of the vehicles included in the second messages and perform driving negotiations.

In the system according to the example embodiment of the present disclosure, CCTV 2 (320) may acquire the unique ID of the vehicle 110 by imaging the license plate of the vehicle 110, update the first temporary ID of the vehicle 110 in the first message received from RSU 2 (220) with the second temporary ID of the vehicle 110, and generate the second message including the second temporary ID of the vehicle 110.

In the system according to the example embodiment of the present disclosure, RSU 2 (220) may transmit the first message to CCTV 2 (320).

In the system according to the example embodiment of the present disclosure, when CCTV 2 (320) updates the first temporary ID (i.e., the temporary ID before the change) of the vehicle 110 in the first message with the second temporary ID of the vehicle 110, CCTV 2 (320) may identify a correspondence between the first message and the vehicle 110 using the unique ID of the vehicle 110 obtained by imaging the license plate and generate the second message by updating the first temporary ID of the vehicle 110 in the first message with the second temporary ID of the vehicle 110 received from the vehicle 110.

In the system according to the example embodiment of the present disclosure, when CCTV 2 (320) identifies the correspondence between the first message and the vehicle 110 (correspondence between a unique ID included in the first message and a unique ID of the vehicle 110), CCTV 2 (320) may extract a unique ID of the vehicle 110 from the first message, which includes the encryption value of the unique ID of the vehicle 110 and the ID of CCTV 1 (310), the ID of CCTV 1 (310), and an encryption value of the unique ID of the vehicle 110 using the unique ID of the vehicle 110 obtained by imaging the license plate, and identify the correspondence between the first message and the vehicle 110 by comparing the unique ID of the vehicle 110 in the first message with the unique ID of the vehicle 110 obtained by imaging the license plate.

The system according to the example embodiment of the present disclosure may further include RSU 1 (210) and CCTV 1 (310) in the communicable area of the RSU 1 (210).

In the system according to the example embodiment of the present disclosure, CCTV 1 (310) may acquire the unique ID of the vehicle 110 by imaging the license plate of the vehicle 110 and generate the first message which includes the encryption value of the unique ID of the vehicle 110 and the ID of CCTV 1 (310), the ID of CCTV 1 (310), the encryption value of the unique ID of the vehicle 110, and the first temporary ID of the vehicle 110.

In the system according to the example embodiment of the present disclosure, CCTV 1 (310) may transmit the first message to RSU 1 (210), and RSU 1 (210) may transmit the first message to RSU 2 (220) on the travel route of the vehicle 110 when the vehicle 110 moves.

As described above, even when two or more vehicles travel in the communicable area of a specific RSU, it is possible to specify a vehicle by checking the unique ID of the vehicle and perform a driving negotiation. When a driving negotiation is performed using the unique ID of a vehicle, privacy may be compromised. However, according to the present disclosure, the unique ID of a vehicle is not exposed, that is, the unique ID of a vehicle is hashed and transmitted to RSUs, so that the RSUs can continuously perform a driving negotiation without compromising privacy.

The above description may also apply to the vehicle 120.

Figure 5:
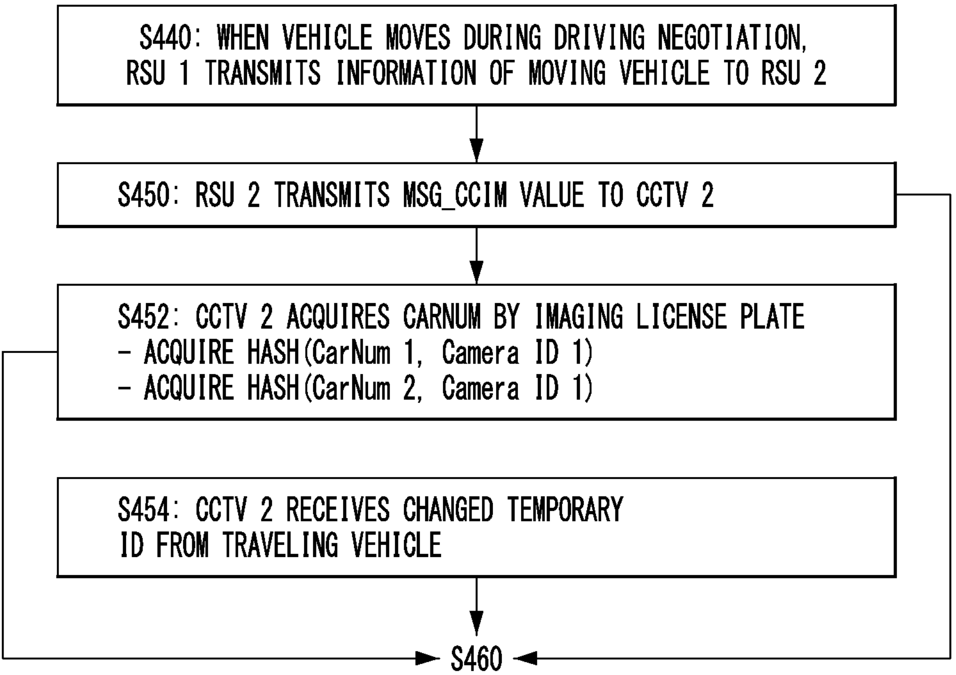
Figure 6:
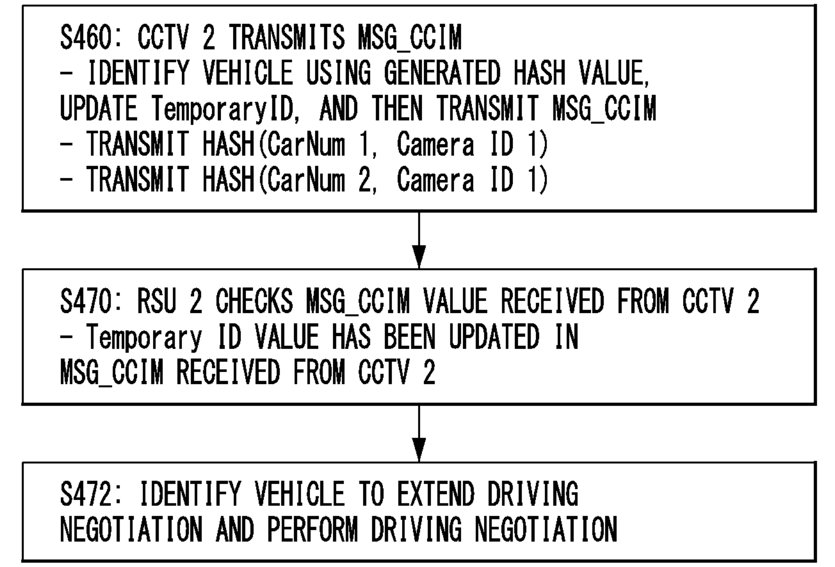

FIGS. 4 to 6 are conceptual diagrams illustrating a driving negotiation process between a traveling vehicle and RSUs in detail according to an example embodiment of the present disclosure.

A driving negotiation process between a traveling vehicle and RSUs will be described below with reference to FIGS. 3 to 6.

In operation S420, CCTV 1 (310) may image the license plate of a vehicle on a road. Here, CCTV 1 (310) may acquire the unique ID (CarNum 1) of vehicle 1 (110) on the road. Also, CCTV 1 (310) may acquire the unique ID (CarNum 2) of vehicle 2 (120) on the road.

In operation S430, CCTV 1 (310) may generate and transmit a first message (MSG_CCIM) to RSU 1 (210). Here, the MSG_CCIM may be generated for each vehicle. For example, a first message (MSG_CCIM 1) for vehicle 1 (110) may include HASH (CarNum 1, Camera ID 1), CameraID 1, HASH (CarNum 1), and TemporaryID. For example, a second message (MSG_CCIM 2) for vehicle 2 (120) may include HASH (CarNum 2, Camera ID 1), CameraID 1, HASH (CarNum 2), and TemporaryID.

In operation S440, when the vehicle moves during a driving negotiation, RSU 1 (210) may transmit information of the moving vehicle to RSU 2 (220).

In operation S450, RSU 2 (220) may transmit an MSG_CCIM value to CCTV 2 (320). For example, when both vehicle 1 (110) and vehicle 2 (120) move during driving negotiations, RSU 2 (220) may transmit the value of MSG_CCIM 1 for vehicle 1 (110) and the value of MSG_CCIM 2 for vehicle 2 (120) to CCTV 2 (320).

In operation S452, CCTV 2 (320) may acquire the unique ID (CarNum) of the vehicle by imaging the license plate of the vehicle on the road. For example, CCTV 2 (320) may acquire the unique ID (CarNum 1) of vehicle 1 (110) and the unique ID (CarNum 2) of vehicle 2 (120). Here, CCTV 2 (320) may acquire HASH (CarNum 1, CameraID 1) from the received value of MSG_CCIM 1. Also, CCTV 2 (320) may acquire HASH (CarNum 2, CameraID 1) from the received value of MSG_CCIM 2.

CCTV 2 (320) may generate a HASH value by encrypting the unique ID of the vehicle acquired by imaging the license plate. For example, CCTV 2 (320) may generate HASH (CarNum 1) by encrypting the unique ID (CarNum 1) of vehicle 1 (110) and generate HASH (CarNum 2) by encrypting the unique ID (CarNum 2) of vehicle 2 (120).

In operation S454, CCTV 2 (320) may receive a changed temporary ID from the traveling vehicle.

In operation S460, CCTV 2 (320) may transmit an MSG_CCIM to RSU 2 (220). CCTV 2 (320) may identify a correspondence between the vehicles by comparing the unique ID (or the hash value) of the vehicle obtained through the MSG_CCIM received from RSU 2 (220) with the unique ID of the vehicle obtained by imaging the license plate. For example, it may be determined whether HASH (CarNum 1) included in the value of MSG_CCIM 1 corresponds to HASH (CarNum 1) generated by CCTV 2 (320). When the unique IDs of the vehicles correspond to each other, the temporary ID of the vehicle included in the MSG_CCIM may be updated with the temporary ID received in operation S454. For example, in the MSG_CCIM transmitted from CCTV 2 (320) to RSU 2 (220), the temporary ID of the vehicle may be updated. For example, the content of the MSG_CCIM transmitted from CCTV 2 (320) to RSU 2 (220) may be {HASH (CarNum 1, Camera ID 1), Camera ID 1, HASH (CarNum 1), Changed Temporary ID of Vehicle 1}. Also or alternatively, when the vehicle imaged by CCTV 2 (320) is vehicle 2 (120) and a temporary ID of vehicle 2 (120) is acquired, the content of the MSG_CCIM may be {HASH (CarNum 2, Camera ID 1), Camera ID 1, HASH (CarNum 2), Changed Temporary ID of Vehicle 2}.

According to another example embodiment of the present disclosure, a message may be identified as an updated message for the same vehicle based on a message ID (MsgID) included in the message. In this case, an RSU may identify the message as a message for the same vehicle based on the message ID without the unique ID (CarNum) of the vehicle. Meanwhile, a CCTV may identify a vehicle by imaging the license number of the vehicle and thus may determine which vehicle the message is for using a hash value of the unique ID of the vehicle rather than a message ID.

In operation S470, RSU 2 (220) may check the MSG_CCIM value received from CCTV 2 (320). In other words, RSU 2 (220) may determine whether HASH (CarNum, Camera ID) values of the MSG_CCIM value transmitted by RSU 2 (220) correspond to HASH (CarNum, Camera ID) values of the MSG_CCIM value received from CCTV 2 (320).

Here, the MSG_CCIM received from CCTV 2 (320) may be a value in which the temporary ID has been updated.

When it is determined in operation S470 that the HASH (CarNum, Camera ID) values of the MSG_CCIM value transmitted by RSU 2 (220) correspond to the HASH (CarNum, Camera ID) values of the MSG_CCIM value received from CCTV 2 (320), in operation S472, RSU 2 (220) may identify the vehicle with which the driving negotiation will continue and/or be extended and perform the negotiation.

According to the present disclosure described above, when a vehicle moves, a temporary ID changes, but a driving negotiation can continue and/or be extended using the message specifications newly defined in the present disclosure.

Figure 7:
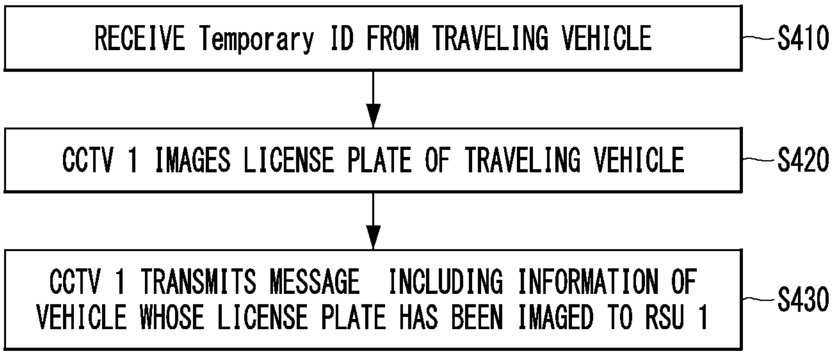
FIG. 7 is an operational flowchart illustrating a process in which a first CCTV supports a driving negotiation according to an example embodiment of the present disclosure.

FIG. 7 is an operational flowchart illustrating a process in which a first CCTV supports a driving negotiation according to an example embodiment of the present disclosure.

The process will be described below with reference to FIGS. 3 and 7 together.

A driving negotiation method according to an example embodiment of the present disclosure may include the following operations S410 to S430.

In operation S410, CCTV 1 (310) in the communicable area of RSU 1 (210) may receive temporary IDs from traveling vehicles 1 and 2 (110 and 120).

In operation S420, CCTV 1 (310) may acquire the unique ID of a vehicle by imaging the license plate of the vehicle.

In operation S430, CCTV 1 (310) may transmit a message including information of the vehicle whose license plate has been imaged to RSU 1 (210). Specifically, CCTV 1 (310) may generate a first message including encryption values of the unique ID of the vehicle and the ID of CCTV 1 (310), the ID of CCTV 1 (310), an encryption value of the unique ID of the vehicle, and a first temporary ID of the vehicle and transmit the first message to RSU 1 (210).

Figure 8:
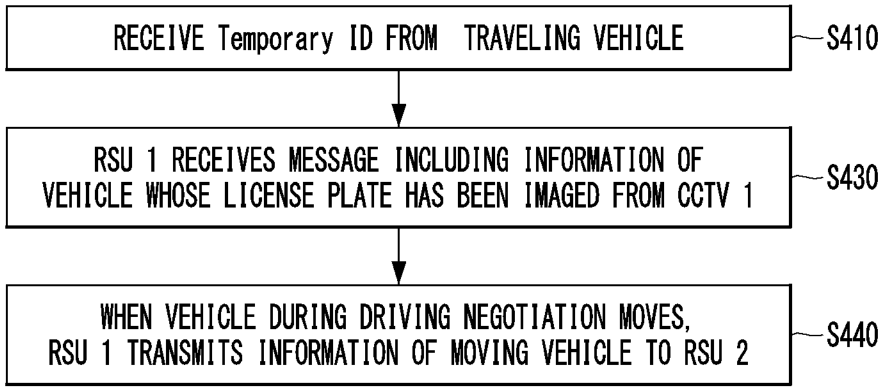
FIG. 8 is an operational flowchart illustrating a process in which a first RSU supports a driving negotiation according to an example embodiment of the present disclosure.

FIG. 8 is an operational flowchart illustrating a process in which a first RSU supports a driving negotiation according to an example embodiment of the present disclosure.

The process will be described below with reference to FIGS. 3 and 8 together.

The driving negotiation method according to the example embodiment of the present disclosure may include the following operations S430 and S440.

In operation S410, RSU 1 (210) may receive temporary IDs from the traveling vehicles 110 and 120.

In operation S430, RSU 1 (210) may receive the message (first message) including information of the vehicle whose license plate has been imaged from CCTV 1 (310).

In operation S440, when the traveling vehicle moves, RSU 1 (210) may transmit the information of the moving vehicle to RSU 2 (220). In other words, RSU 1 (210) may transmit the first message to RSU 2 (220) on the travel route of the vehicle when the vehicle moves.

Figure 9:
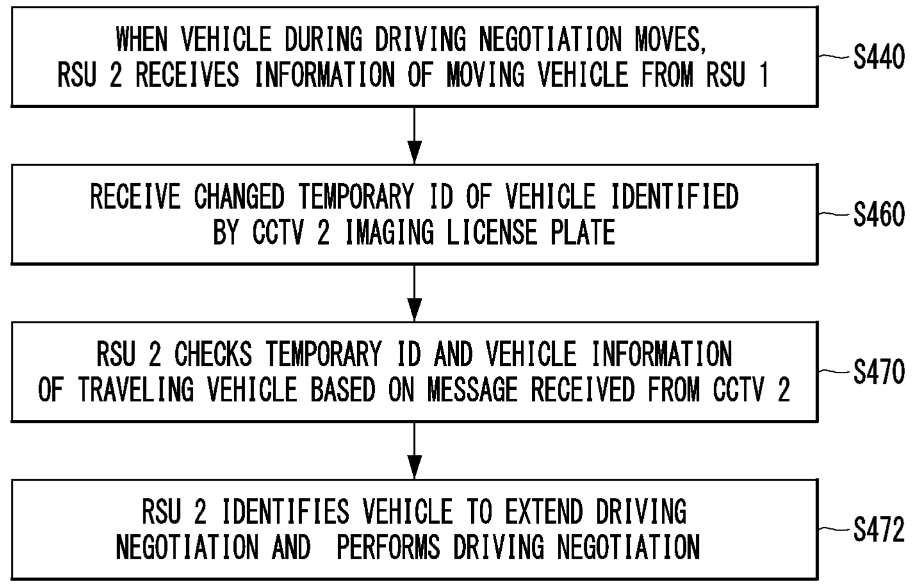
FIG. 9 is an operational flowchart illustrating a process in which a second RSU supports a driving negotiation in cooperation with a nearby second CCTV according to an example embodiment of the present disclosure.

FIG. 9 is an operational flowchart illustrating a process in which a second RSU supports a driving negotiation in cooperation with a nearby second CCTV according to an example embodiment of the present disclosure.

The process will be described below with reference to FIGS. 3 and 9 together.

A method of performing a driving negotiation with a traveling vehicle according to an example embodiment of the present disclosure may include the following operation S440, operation S460, operation S470, and operation S472.

In operation S440, when the vehicle (e.g., vehicle 1 (110) and/or vehicle 2 (120)) which is performing the driving negotiation moves, RSU 2 (220) may receive the first message including the first temporary ID of a vehicle (e.g., vehicle 1 (110)) from RSU 1 (210) on the past route of the vehicle (e.g., vehicle 1 (110)).

In operation S460, RSU 2 (220) may receive a second message including a second temporary ID (e.g., "B") of the vehicle (e.g., vehicle 1 (110)) identified by a CCTV (CCTV 2 (320)) in the communicable area of RSU 2 (220) from CCTV 2 (320).

In operation S470, RSU 2 (220) may check the second temporary ID (e.g., "B") of the vehicle based on the second message received from CCTV 2 (320).

In operation S472, RSU 2 (220) may identify the vehicle (e.g., vehicle 1 (110)) as a target with which the driving negotiation will continue and/or be extended and perform the driving negotiation with the identified vehicle (e.g., vehicle 1 (110)).

The foregoing operation S470, which is an operation in which RSU 2 (220) checks the second temporary ID of the vehicle based on the second message received from CCTV 2 (320), may include an operation of identifying the second temporary ID (e.g., "B") of the vehicle based on the second message and an operation of identifying the encryption value of the unique ID (e.g., CarNum 1) of the vehicle based on the second message.

The foregoing operation S472, which is an operation in which RSU 2 (220) identifies the vehicle as a target with which the driving negotiation will continue and/or be extended and performs the driving negotiation with the identified vehicle, may include an operation of identifying the vehicle (e.g., vehicle 1 (110)) as a target with which the driving negotiation will continue and/or be extended based on the encryption value of the unique ID (e.g., CarNum 1) of the vehicle (e.g., vehicle 1 (110)) and an operation of performing the driving negotiation with the vehicle based on the second temporary ID (e.g., "B") of the vehicle (e.g., vehicle 1 (110)).

In the driving negotiation method according to the example embodiment of the present disclosure, the first message may include an encryption value of the unique ID (e.g., CarNum 1 of vehicle 1 (110)) of the vehicle and a CCTV ID (e.g., the ID of CCTV 1 (310)), the CCTV ID (e.g., the ID of CCTV 1 (310)), an encryption value of the unique ID of the vehicle (e.g., CarNum 1 of vehicle 1 (110)), and the first temporary ID (e.g., "A") of the vehicle (e.g., vehicle 1 (110)).

The driving negotiation method according to the example embodiment of the present disclosure may further include an operation in which CCTV 2 (320) acquires the unique ID (CarNum 1) of the vehicle (e.g., vehicle 1 (110)) by imaging the license plate of the vehicle, an operation in which CCTV 2 (320) updates the first temporary ID (e.g., "A") of the vehicle (e.g., vehicle 1 (110)) in the first message received from RSU 2 (220) with the second temporary ID (e.g., "B") of the vehicle, and an operation in which CCTV 2 (320) generates the second message including the second temporary ID (e.g., "B") of the vehicle.

The driving negotiation method according to the example embodiment of the present disclosure may further include an operation in which RSU 2 (220) transmits the first message to CCTV 2 (320).

The operation in which CCTV 2 (320) updates the first temporary ID (e.g., "A") of the vehicle (e.g., vehicle 1 (110)) in the first message with the second temporary ID (e.g., "B") of the vehicle may include an operation in which CCTV 2 (320) may include an operation in which CCTV 2 (320) identifies a correspondence between the first message and the vehicle using the unique ID (e.g., CarNum 1) of the vehicle obtained by imaging the license plate and an operation in which CCTV 2 (320) generates the second message by updating the first temporary ID (e.g., "A") of the vehicle (e.g., vehicle 1 (110)) in the first message with the second temporary ID (e.g., "B") of the vehicle received from the vehicle (e.g., vehicle 1 (110).

The operation in which CCTV 2 (320) identifies the correspondence between the first message and the vehicle may include an operation of extracting the unique ID (e.g., CarNum 1) of the vehicle in the first message including the encryption value (e.g., HASH (CarNum 1, CameraID 1)) of the unique ID (e.g., CarNum 1) of the vehicle and a first CCTV ID (i.e., the ID of CCTV 1 (310)), the first CCTV ID (i.e., the ID of CCTV 1 (310)), and the encryption value (e.g., HASH (CarNum 1)) of the unique ID of the vehicle using the unique ID (e.g., CarNum 1) of the vehicle obtained by imaging the license plate and an operation of identifying the correspondence between the first message and the vehicle by comparing the unique ID (e.g., CarNum 1) of the vehicle in the first message with the unique ID (e.g., CarNum 1) of the vehicle obtained by imaging the license plate.

According to the related art, a driving negotiation is allowed according to message specifications defined in Society of Automotive Engineers (SAE) J2735. In other words, the SAE J2735 message set for cooperative driving may be expanded. As message specifications, specifications for V2V communication and V2I communication are proposed.

For example, the basic safety message (BSM) standard may be used for V2V communication, and the probe vehicle data (PVD) standard may be used for V2I communication.

In the present disclosure, a message set specialized for CCTVs is designed, and message frame elements, data frame elements, and DEs for cooperative driving through CCTVs are defined. Here, data at a message frame level and other levels is defined for a case where a driving negotiation scenario is added.

In the present disclosure, elements for identifying counterfeit vehicles may be defined as DE_CTV. In the present disclosure, elements required for continuing a driving negotiation may be defined as a DE_CameraID value and a DE_CarNum value. According to the present disclosure, information required for cooperative driving through CCTVs is defined later as new data frames, which facilitates data expansion.

According to the related art, RSUs are limited in their ability to cover all areas of the road to perform driving negotiations. When the surrounding infrastructure supports more information, driving negotiations may be performed more smoothly, and the safety of driving negotiations may be enhanced.

However, according to the related art, key infrastructure, such as CCTVs. cannot participate in driving negotiations even when it is necessary and/or required to participate, because message specifications are not supported.

The present disclosure is provided to substantially obviate one or more problems due to limitations and disadvantages of the related art. Example embodiments of the present disclosure provide a device that allows a system having imaging apparatuses, such as CCTVs, in a particular area on a road as infrastructure around the road to participate in driving negotiations.

Example embodiments of the present disclosure also provide message specifications for infrastructure (e.g., CCTVs) around a road for accurately identifying the travel status of a vehicle.

Example embodiments of the present disclosure also provide a vehicle driving negotiation method in which safety is enhanced by cooperation and role division between RSUs and CCTVs.

According to an example embodiment of the present disclosure, a system having imaging apparatuses, such as CCTVs, in a particular area on a road as infrastructure around the road can participate in driving negotiations according to the proposed message specifications.

According to an example embodiment of the present disclosure, an RSU provides information required for a driving negotiation to another RSU. Accordingly, the driving negotiations can be smoothly performed, and the safety of the driving negotiation can be enhanced.

According to an example embodiment of the present disclosure, an RSU is not directly provided with the unique ID of a vehicle but is only provided with an encryption value of the unique ID of a vehicle. Accordingly, a driving negotiation can be performed without compromising the privacy of the vehicle to the RSU.

According to an example embodiment of the present disclosure, a temporary ID is used for a driving negotiation between RSUs and a vehicle without exposing the unique ID to the RSUs, and thus a new driving negotiation may be performed every time. In this case, the temporary ID in a message is updated with the unique ID of the vehicle encrypted by a CCTV or an encryption value (hash value) of the unique ID. Accordingly, even when the RSUs are not aware of the unique ID of the vehicle, it is possible to detect that the driving negotiation is for the same vehicle and maintain the driving negotiation.

According to an example embodiment of the present disclosure, specifications of driving negotiation messages for CCTVs may be defined so that CCTVs can provide information to RSUs. Also, according to an example embodiment of the present disclosure, it is possible to provide a method of maintaining a driving negotiation even when a temporary ID changes.

According to an example embodiment of the present disclosure, a vehicle that falsely requests cooperative driving can be easily determined. For example, it is possible to determine a vehicle that sends a message under the assumed name of an emergency vehicle (ambulance, fire truck, police car, or the like). In this case, the authenticity of the vehicle which is under the assumed name can be verified using a predefined CIM message generated by a CCTV.

Figure 10:
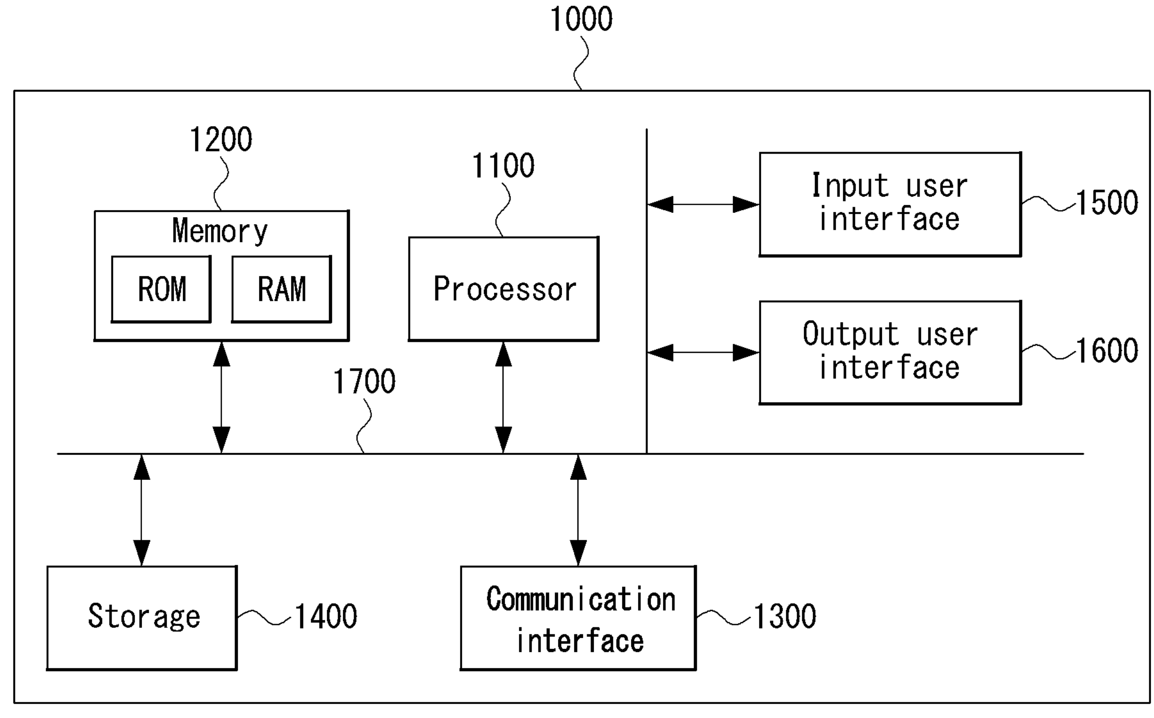
FIG. 10 is a conceptual diagram illustrating a computing system for performing electronic communication and signal/information processing in generalized RSUs, surrounding infrastructure, and/or CCTVs that may perform at least some of the processes of FIGS. 1 to 9.

FIG. 10 is a conceptual diagram illustrating a computing system for performing electronic communication and signal/information processing in generalized RSUs, surrounding infrastructure, and/or CCTVs that may perform at least some of the processes of FIGS. 1 to 9.

For example, the RSUs or CCTVs of FIGS. 1 to 9 may be implemented the same as the computing system of FIG. 10.

At least a partial process of a method of performing a driving negotiation with a traveling vehicle and/or a method of supporting a driving negotiation according to an example embodiment of the present disclosure may be performed by a computing system 1000 of FIG. 10.

Referring to FIG. 10, the computing system 1000 according to the example embodiment of the present disclosure may include a processor 1100, a memory 1200, a communication interface 1300, a storage 1400, an input user interface 1500, an output user interface 1600, and a bus 1700.

The computing system 1000 according to the example embodiment of the present disclosure may include at least one processor 1100 and the memory 1200 which stores instructions directing the at least one processor 1100 to perform at least one operation. At least some operations of a method according to an example embodiment of the present disclosure may be performed when the at least one processor 1100 loads instructions from the memory 1200 and executes the instructions.

The processor 1100 may be a central processing unit (CPU), a graphics processing unit (GPU), or a dedicated processor that performs methods according to example embodiments of the present disclosure.

Each of the memory 1200 and the storage 1400 may be at least one of a volatile storage medium and a non-volatile storage medium. For example, the memory 1200 may be at least one of a read-only memory (ROM) and a random-access memory (RAM).

Also, the computing system 1000 may include the communication interface 1300 that performs communication through a wireless network.

Further, the computing system 1000 may include the storage 1400, the input user interface 1500, the output user interface 1600, and the like.

In addition, the components included in the computing system 1000 may be connected to the bus 1700 and communicate with each other.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of performing a driving negotiation with a traveling vehicle, the method comprising:

when a vehicle performing a driving negotiation moves, receiving, by a road side unit (RSU), a first message including a first temporary identification (ID) of the vehicle and an encryption value of a unique ID of the vehicle from a first RSU on a past route of the vehicle;

receiving, by the RSU, a second message including a second temporary ID of the vehicle identified by a closed-circuit television (CCTV) in a communicable area of the RSU from the CCTV;

obtaining or extracting, by the RSU, an encryption value of a unique ID corresponding to the vehicle associated with the second temporary ID based on the second message;

determining, by the RSU, a correspondence between the vehicle associated with the first temporary ID and the vehicle associated with the second temporary ID, by comparing the encryption value of the unique ID obtained or derived based on the second message;

identifying, by the RSU, that the second temporary ID is an updated temporary ID corresponding to the first temporary ID of the vehicle based on an identification of the second temporary ID being the updated temporary ID corresponding to the first temporary ID; and identifying, by the RSU, the vehicle as a target to extend the driving negotiation and performing the driving negotiation with the identified vehicle based on the identification.

2. The method of claim 1, wherein the first message includes an encryption value of the unique ID of the vehicle and a CCTV ID, the CCTV ID, an encryption value of the unique ID of the vehicle, and the first temporary ID of the vehicle.

3. The method of claim 1, further comprising:

imaging, by the CCTV, a license plate of the vehicle to acquire the unique ID of the vehicle;

updating, by the CCTV, the first temporary ID of the vehicle in the first message received from the RSU with the second temporary ID of the vehicle; and generating, by the CCTV, the second message including the second temporary ID of the vehicle.

4. The method of claim 3, further comprising transmitting, by the RSU, the first message to the CCTV.

5. The method of claim 3, wherein the updating, by the CCTV, of the first temporary ID of the vehicle in the first message with the second temporary ID of the vehicle comprises:

identifying, by the CCTV, a correspondence between the first message and the vehicle using the unique ID of the vehicle obtained through the imaging; and updating, by the CCTV, the first temporary ID of the vehicle in the first message with the second temporary ID of the vehicle received from the vehicle to generate the second message.

6. The method of claim 5, wherein the identifying, by the CCTV, the correspondence between the first message and the vehicle comprises:

extracting a unique ID of the vehicle from the first message, which includes an encryption value of the unique ID of the vehicle and a first CCTV ID, the first CCTV ID, and an encryption value of the unique ID of the vehicle, using the unique ID of the vehicle obtained through the imaging; and comparing the unique ID of the vehicle in the first message with the unique ID of the vehicle obtained through the imaging to identify the correspondence between the first message and the vehicle.

7. The method of claim 1, further comprising:

imaging, by a first CCTV in a communicable area of the first RSU, a license plate of the vehicle to acquire the unique ID of the vehicle; and generating, by the first CCTV, the first message which includes an encryption value of the unique ID of the vehicle and a first CCTV ID, the first CCTV ID, an encryption value of the unique ID of the vehicle, and the first temporary ID of the vehicle.

8. The method of claim 7, further comprising:

transmitting, by the first CCTV, the first message to the first RSU; and transmitting, by the first RSU, the first message to the RSU on a travel route of the vehicle when the vehicle moves.

9. A system for performing a driving negotiation with a traveling vehicle, the system comprising:

a road side unit (RSU); and a closed-circuit television (CCTV) in a communicable area of the RSU, wherein, when a vehicle performing a driving negotiation moves, the RSU receives a first message including a first temporary identification (ID) of the vehicle and an encryption value of a unique ID of the vehicle from a first RSU on a past route of the vehicle, the RSU receives a second message including a second temporary ID of the vehicle identified by the CCTV from the CCTV, the RSU obtains or extracts an encryption value of a unique ID corresponding to the vehicle associated with the second temporary ID based on the second message, the RSU determines a correspondence between the vehicle associated with the first temporary ID and the vehicle associated with the second temporary ID; by comparing the encryption value of the unique ID obtained or derived based on the second message, the RSU identifies that the second temporary ID is an updated temporary ID corresponding to the first temporary ID of the vehicle based on an identification of the second temporary ID being the updated temporary ID corresponding to the first temporary ID; and the RSU identifies the vehicle as a target to extend the driving negotiation and performs the driving negotiation with the identified vehicle based on the identification.

10. The system of claim 9, wherein the first message includes an encryption value of the unique ID of the vehicle and a CCTV ID, the CCTV ID, an encryption value of the unique ID of the vehicle, and the first temporary ID of the vehicle.

11. The system of claim 9, wherein the CCTV acquires the unique ID of the vehicle by imaging a license plate of the vehicle, the CCTV updates the first temporary ID of the vehicle in the first message received from the RSU with the second temporary ID of the vehicle, and the CCTV generates the second message including the second temporary ID of the vehicle.

12. The system of claim 11, wherein the RSU transmits the first message to the CCTV.

13. The system of claim 11, wherein, when the CCTV updates the first temporary ID of the vehicle in the first message with the second temporary ID of the vehicle, the CCTV identifies a correspondence between the first message and the vehicle using the unique ID of the vehicle obtained by imaging the license plate and generates the second message by updating the first temporary ID of the vehicle in the first message with the second temporary ID of the vehicle received from the vehicle.

14. The system of claim 13, wherein, when the CCTV identifies the correspondence between the first message and the vehicle, the CCTV extracts a unique ID of the vehicle from the first message, which includes an encryption value of the unique ID of the vehicle and a first CCTV ID, the first CCTV ID, and an encryption value of the unique ID of the vehicle, using the unique ID of the vehicle obtained by imaging the license plate and identifies the correspondence between the first message and the vehicle by comparing the unique ID of the vehicle in the first message with the unique ID of the vehicle obtained by imaging the license plate.

15. The system of claim 9, further comprising:

the first RSU; and a first CCTV in a communicable area of the first RSU, wherein the first CCTV acquires the unique ID of the vehicle by imaging a license plate of the vehicle, and the first CCTV generates the first message including an encryption value of a unique ID of the vehicle and a first CCTV ID, an encryption value of the unique ID of the vehicle, and the first temporary ID of the vehicle.

16. The system of claim 15, wherein the first CCTV transmits the first message to the first RSU, and the first RSU transmits the first message to the RSU on a travel route of the vehicle when the vehicle moves.

* * * * *